US007987778B1

(12) United States Patent
DeWaard

(10) Patent No.: US 7,987,778 B1
(45) Date of Patent: Aug. 2, 2011

(54) PRE-SEPARATOR FOR A SCREEN SEPARATOR

(75) Inventor: Dave DeWaard, Lynden, WA (US)

(73) Assignee: Daritech, Inc., Lynden, WA (US)

(*) Notice: Subject to any disclaimer, the term of this patent is extended or adjusted under 35 U.S.C. 154(b) by 426 days.

(21) Appl. No.: 12/145,888

(22) Filed: Jun. 25, 2008

(51) Int. Cl.
*B30B 9/14* (2006.01)
*B30B 9/26* (2006.01)
*B01D 21/06* (2006.01)

(52) U.S. Cl. ......................... 100/117; 100/112; 210/413

(58) Field of Classification Search .................. 100/104, 100/117, 112; 210/411, 414, 415, 372, 373, 210/378, 413
See application file for complete search history.

(56) References Cited

U.S. PATENT DOCUMENTS 1,993,214 A 3/1935 Hass
2,066,479 A 1/1937 MacIsaac
2,680,602 A 6/1954 Nelson et al.
2,982,411 A 5/1961 Fontein
3,333,700 A 8/1967 Coleman
3,606,945 A 9/1971 Watson et al.
4,608,157 A * 8/1986 Graves ............................ 210/86
4,849,105 A * 7/1989 Borchert ....................... 210/408
5,275,728 A * 1/1994 Koller ........................... 210/391
5,409,610 A 4/1995 Clark
5,728,297 A 3/1998 Koller
6,231,631 B1 5/2001 Suzuki
6,355,167 B1 3/2002 Wensauer
7,258,238 B2 8/2007 Raghupathy
7,306,731 B1 * 12/2007 DeWaard ...................... 210/607
* cited by examiner

*Primary Examiner* — Jimmy T Nguyen
(74) *Attorney, Agent, or Firm* — Michael R. Schacht; Schacht Law Office, Inc.

(57) ABSTRACT

A pre-separator for a screw press separator wherein the pre-separator increases the concentration of solid material in a water solid material mixture. The pre-separator is configured to have a frustoconical screen surface where a plurality of wiper blades engage the interior portion of the surface to provide de-watering action, and the plurality of blades are configured to reposition with respect to the center axis of the frustoconical surface to allow for engagement between the interior surface of the frustoconical screen, and the wiper blades.

21 Claims, 7 Drawing Sheets

PRE-SEPARATOR FOR A SCREEN SEPARATOR

BACKGROUND OF THE DISCLOSURE

Screw press separators are utilized for separating liquid and solid material from one another for de-watering fibrous material, such as manure. Screen separators generally operate on a flooded principal where the interior chamber of a screen separator is flooded with manure/water mixture.

One common function with screen separators is that they operate on the principle of having an internal auger which is in close engagement with a conical screen-like mesh having a foraminous surface with a plurality of holes. However, with lower concentration of solids being passed through the system, present analysis indicates that any clearances between the outer surface of the auger and the interior surface of the cylindrical screen member can reduce the efficiency of the de-watering of the material passing therethrough. The pre screen separator described herein in one form is to be flooded for proper operation in order for the upper portion of the pre-separator to function. With this the pre-screen separator in place, the wipers automatically move downwardly through the coupler joint. As noted above, prior art separators do not operate effectively when wear occurs, such as when tolerance is lost and the separator when the augur can wipe the solids off the screen. When there is an excessive gap between the components of a separator fiber can build therebetween and the auger does not "wipe" away the fiber from the interior surface of the screen and "blinding" occurs.

With the preseparator device, the de-watered solids are transferred to the screw-press separator, increasing production of the lower piece by approximately double with a fractional of power usage, and further, the upper unit is more robust and self-adjusting where when the particles hit the foraminous frustoconical surface it is wiped away.

The mechanism described herein operates as a flooded system where one insert line is present and the other line continues back to the continuous pump where the upper separator is always being overfed. Any time the lower separator loses its tolerance there is a hard time separating and the volume goes way down where the wiping does not work and "fines" plug the holes down below where the screw press separator drops off significantly. This is typically in a slush barn. In a scrape barn with 8-10% solids there is a lot of fiber in the screw press separator portion and the wear issues are not as critical where there is sufficient fiber to scrape in a flush system. When the input material is, for example, only 1% solids the efficiency and performance of a screw press separator lowers particularly the screw press falls out of tolerance with the distance between the auger and the screen member. Therefore, increasing the solids ratio by feeding the system with higher percentage of solids, such as going from 1.5-3% allows the lower separator to operate much more efficiently to, for example, double the efficiency thereof.

SUMMARY OF THE DISCLOSURE

A pre-separator for separating the liquid and the solid parts of effluent is disclosed herein. The pre-separator in one form is operatively configured to be positioned in fluid communication with a screw press separator having a flooded system, the pre-separator comprising several elements. One element is a barrel having an interior chamber portion, the barrel having an upper and lower region, an input line positioned in the upper region of the barrel, and a bypass line also positioned in the upper region of the barrel, the barrel further having an effluent line positioned in the lower region thereof. Another element is a screen member having a central axis, being generally configured as a foraminous frustoconical shape having a screen interior surface. The screen member can be operatively configured to be positioned within the barrel such that an upper portion of the screen member defining an entry region is positioned below the input line and the bypass line. In one form, the screen member and the barrel define an effluent discharge chamber which is in fluid communication with the effluent line. A wiper assembly is also disclosed comprising a plurality of wipers, each wiper comprising an edge surface configured to engage the screen interior surface, the wiper assembly arranged to rotate about a central axis of the screen member. A drive system is provided to rotate the wiper assembly with respect to the screen member. A coupling system is provided to transfer torque between the drive system and the wiper assembly, and the coupling system in one form is configured to allow for repositioning of the wiper assembly along the central axis of the screen member so as to maintain engagement between at least one edge surface of a wiper of the wiper assembly and the screen interior surface of the screen member.

The pre-separator may also be configured wherein the wiper assembly comprises three wipers. Each of the wipers of the wiper assembly may be fixedly attached to a base member, the base member having a non-cylindrical interior surface.

The pre-separator may also have three wipers in the wiper assembly. This arrangement allows for the edge surface of at least one wiper to be in engagement with the screen interior surface of the screen member when a particulate matter passes through the pre-separator. As the particulate matter is interposed between a wiper screen member, at least one of the three wipers of the wiper assemblies is in engagement with the screen interior surface of the screen member. The pre-separator may utilize a particulate matter where the manure/water mixture of the particulate matter is less than 2% solids.

The screen interior surface of the pre-separator defines a pre-separation chamber which is operatively configured to be filled with a manure and water mixture during operation of the wiper assembly whereas the excess of the manure water mixture is passed through the bypass line. In one form, the manure water mixture exiting the screen member in a lower portion of the screen member through a pre-separator discharge port has a solid content of greater than 3%.

The pre-separator may be arranged where the drive system comprises a hollow drive shaft. There is a plurality of seals upon the drive shaft, the drive shaft operatively configured to transfer torque to the wiper assembly.

A fiber separating system is also disclosed comprising a screw press separator having an input portion and an output portion, and an interior auger member positioned upon a central shaft, the auger member being fit within a cylindrical screen. An effluent line is also conceived of being positioned in fluid communication with the outer portion of the cylindrical screen. A pre-separator may also be provided in communication with the input portion of the screw press separator. In one form the pre-separator comprises a frustoconical screen member having a central axis and a screen interior surface, with a wiper assembly having a plurality of wipers, each wiper having an edge surface operatively configured to engage the screen interior surface of the frustoconical screen member. A drive system is configured to provide rotation of the wiper assembly with respect to the frustoconical screen member may also be utilized, including a coupling system which is operatively configured to transfer torque between the drive system and the pre-separator system so as to maintain contact of the edge surface of at least one wiper of the wiper assembly and the screen interior surface of the frustoconical screen member.

The fiber separating system may also be provided wherein the screen member is configured to be stationary and the wiper assembly is operatively configured to rotate with respect to the screen member. The fiber separating system may be arranged wherein the frustoconical screen member is configured to rotate with respect to the wiper assembly. The fiber separating system could be configured wherein the wiper assembly is configured to be stationary with respect to rotation about the central axis of the frustoconical screen member. Alternatively, the fiber separating system in one form is arranged wherein the coupling system is configured to allow the wiper assembly to reposition vertically downward as torque is applied thereto so as to maintain the contact of at least one edge surface of a wiper with the screen interior surface. As the edge surface of a wiper wears, the wiper assembly will reposition downwardly to maintain engagement of at least one wiper edge surface with the screen interior surface. The pre-separator in one form is configured to increase the concentration of solids inserted in the pre-separator by over 100%. Further the fiber separating system can include an effluent line which is in fluid communication with the pre-separator so as to channel effluent discharged from the outer portion of the screen member. The effluent line of the pre-separator may be in fluid communication with the effluent line of the screw press separator. The screw press separator and the pre-separator may comprise a flooded system having the mixture of manure and water filled therein between the interior auger member of the screw press separator up through a pre-separation chamber defined in part by the screen interior surface of the frustoconical screen member. An input line may be operatively configured to input the manure and water mixture into the pre-separator chamber, and a bypass line can be configured to allow the manure and water mixture which is not received by the pre-separator system to circulate therethrough back to the input line.

The frustoconical screen member includes a plurality of holes at 3/32 of an inch in diameter, plus or minus 1/64 of an inch. In a narrower range, the plurality of holes in the frustoconical screen member ranges between 1/16 and 1/8 of an inch in diameter.

To utilize the pre-separator, a method of separating water from manure in a water manure mixture is disclosed herein. One step includes providing the water manure mixture into a pre-separator through an input line where a portion of the manure water mixture travels downwardly through a pre-separator system comprising a wiper assembly and a frustoconical screen member. Another step includes providing a rotating action between the wiper assembly and the frustoconical screen member so as to separate a portion of the water of the water manure mixture to an effluent discharge chamber positioned upon an outer region of the screen member. A user could then provide a first thickened water manure mixture of the pre-separator, and transferring this first thickened water manure mixture to a screw press separator, then provide rotation of an auger member in the screw press separator which is operatively configured to rotate within a cylindrical screen so as to separate water from the first thickened water manure mixture to create a second thickened water manure mixture which is ejected at an output portion of the screw press separator. The open area between the auger member and the wiper assembly may be in fluid communication and this collective open area may be a flooded system. A bypass line may be provided in an upper portion of the pre-separator so as to circulate a portion of the water manure mixture back to the input line.

In one form, the water manure mixture entering the pre-separator has a solid content of manure less than 1%. Furthermore, the first thickened water manure mixture exiting the pre-separator has a solid content of manure greater than 1.5%. In a more limited range, the first thickened water manure mixture exiting the pre-separator has a solid content of manure greater than 2%. In another range, the water manure mixture entering the pre-separator has a solid content of manure less than 1.5%. Alternatively, the first thickened water manure mixture may have a solid content of manure of greater than 2% or even greater than 3%.

In one arrangement, the wiper assembly is operatively configured to extend in the substantial direction of a central axis of the screen member so as to maintain engagement of at least one edge surface of a wiper with the screen member. The wiper may be one of a plurality of wipers that comprise in part the wiper assembly. These wipers are arranged so as to maintain a scraping action between the edge surface of the wiper and the screen interior surface of the frustoconical screen member.

In one form, the wiper assembly is comprised of a plurality of wipers which are configured to effectively extend radially outwardly so as to maintain engagement with a screen interior surface of the frustoconical screen member. Other attributes of the components and system are disclosed herein.

DESCRIPTION OF THE PREFERRED EMBODIMENTS

Figure 1:
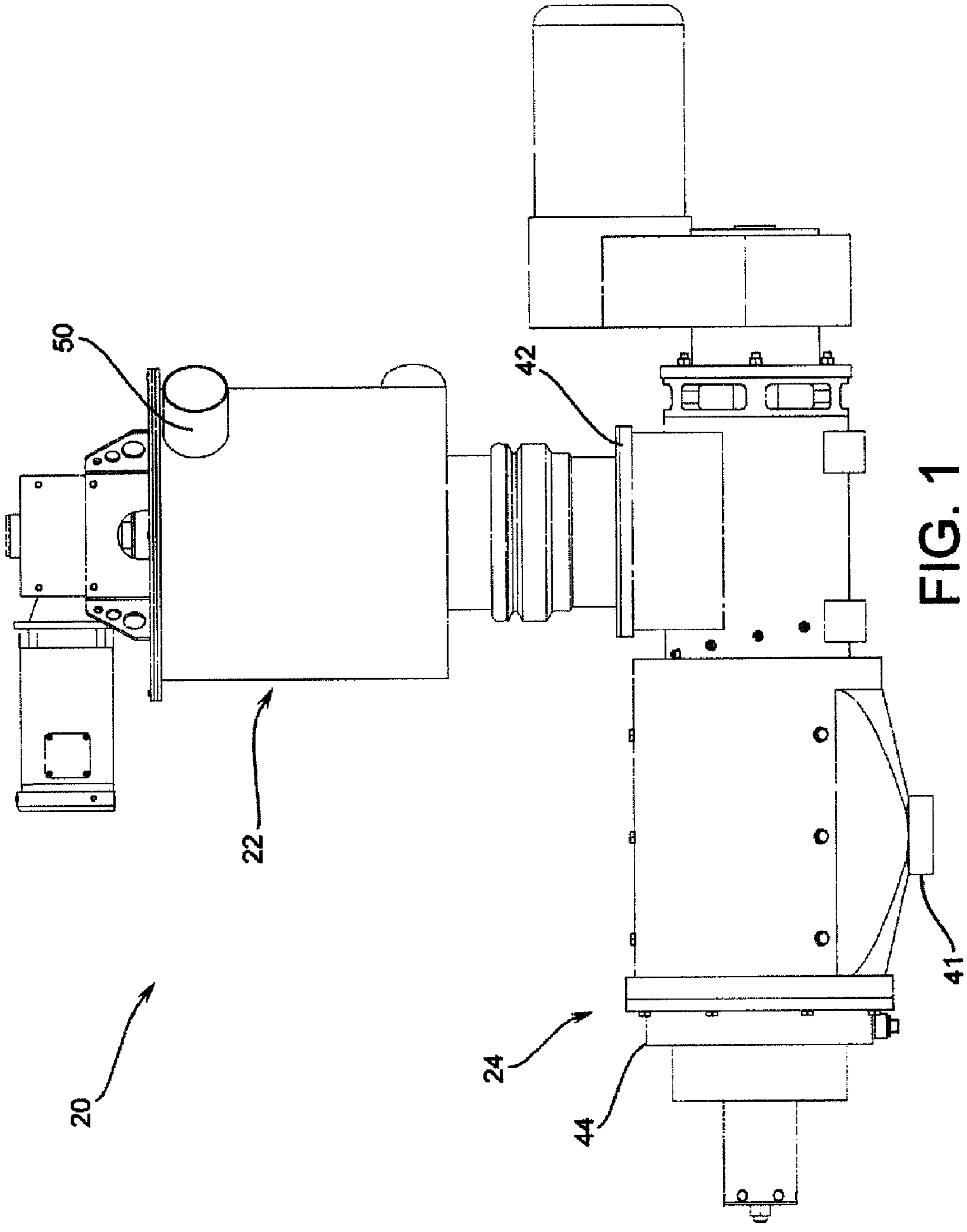
FIG. 1 shows a side view of a fiber separation system which includes a pre-separator and a screw press separator.

As shown in FIG. 1, there is a fiber separator system 20 which in general comprises a pre-separator 22 and a screw press separator 24. The screw press separator 24 is substantially similar to conventional screw press separators such as that sold by Fan, FKC, Press Technology and other screw press vendors. There will first be a general description of the screw press separator 24 followed by a more detailed description of the pre-separator 22.

Figure 4:
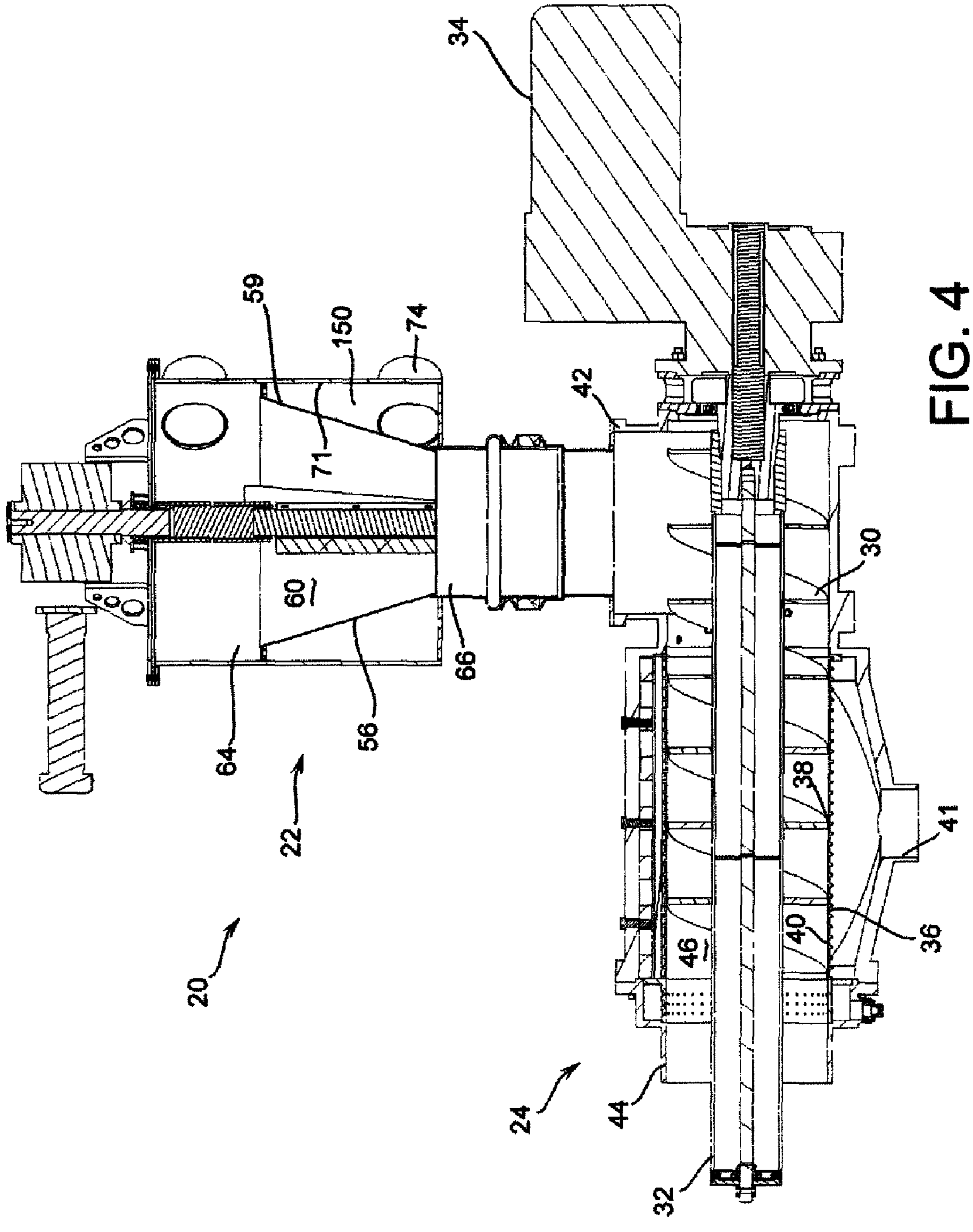
FIG. 4 shows a sectional view of the fiber separation system in one form.
Figure 5:
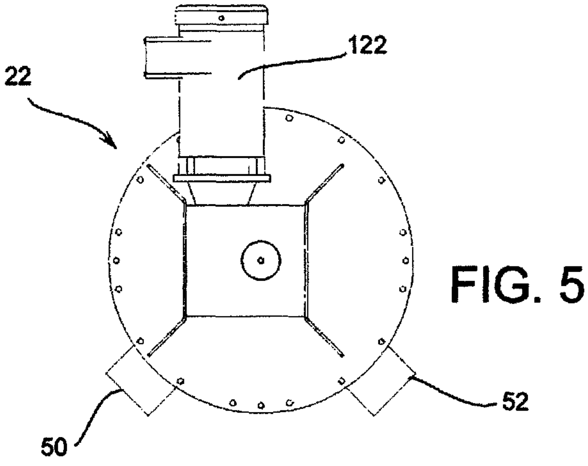
FIG. 5 shows a top view of the pre-separator.
Figure 6:
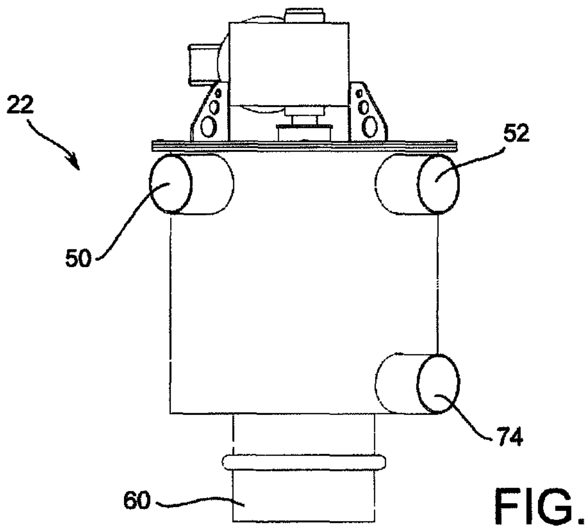
FIG. 6 shows a front view of the pre-separator.
Figure 8:
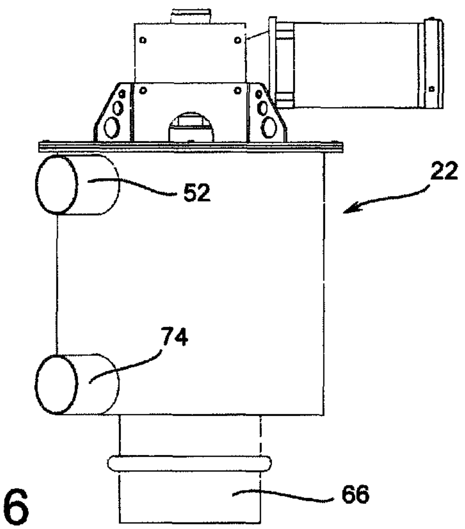
FIG. 8 shows a bottom view of the pre-separator showing the pre-separator discharge port.
Figure 7:
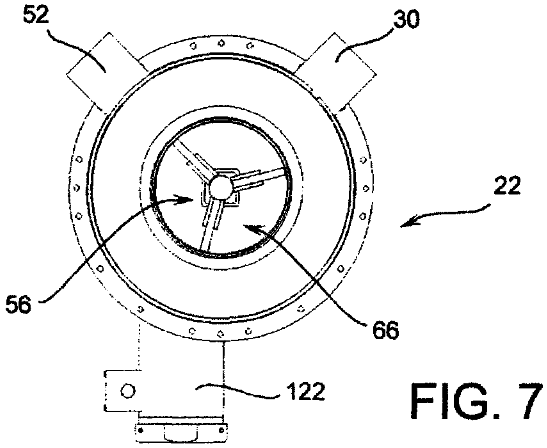
FIG. 7 shows a side view of the pre-separator.

In general, a screw press separator as shown in FIG. 4 is comprised of an interior augur member 30 which is configured to rotate about the central shaft 32. The central shaft 32 can be driven by a drive system 34 which is schematically shown in the right-hand portion of FIG. 4. Positioned around the auger 30 is a cylindrical screen member 36 which is a foraminous screen member which in one form is a bar screen having a plurality of openings allowing water to pass therethrough. In a preferred form, as noted above, the system is utilized for a manure water mixture, but in the broader scope could be used for other areas such as with pulp and paper. In general, it is desirable to separate the manure from the water for handling of the manure solids. The auger member 30 comprises an auger outer surface 38 which in one form is a helical surface extending around the auger. In some forms the auger may increase the rotation rate to provide compression therein of the water manure mixture. In general, the operation and functionality of a screw press separator 24 has operational benefits between the interaction between the inner surface 40 of the cylindrical screen 36 and the auger outer surface 38. This interaction is such that there is a scraping-like action to separate the water from the manure. However, as wear occurs at the auger outer surface 38, a gap can be present which reduces the efficiency of the screw press separator 24. It has been found that providing higher proportions of solid fibrous material to increase the content of manure and the water manure mixture will aid in increasing the efficiency of the screw press separator 24.

Referring back to FIG. 1, the screw press separator 24 further comprises an input portion 42 and an output portion 44. Further an effluent line 41 is provided to collect the water. In general, a plug is ejected near the output portion 44, where for example a counterweighted system is utilized to maintain manure within the auger chamber portion 46 as shown in FIG. 4.

With the foregoing general description in place of the screw press separator 24, there will now be a more detailed discussion of one preferred form of a pre-separator 22.

As introduced above, it has been found that it is desirous to have a pre-separator to increase the efficiency of, for example, an existing screw press separator. Of course, the fiber separator system 20 could be an entire system sold and delivered in itself, or the pre-separator 22 can be a retrofit to existing screw press separators.

As noted above, wear occurs in the operation of a screw press 24 which increases the spacing between various components, in particular the auger outer surface 38 and the interior surface 40 of the cylindrical screen 36. However, other components are subject to wear at the same approximate rate, such as potential components within the pre-separator 22. Therefore, having a pre-separator which provides a robust design to address wear and still provide sufficiently tight tolerances to effectively dewater a water manure mixture by way of scraping provides a desirable benefit of extending the life of the components of the screw press separator 24.

Figure 2:
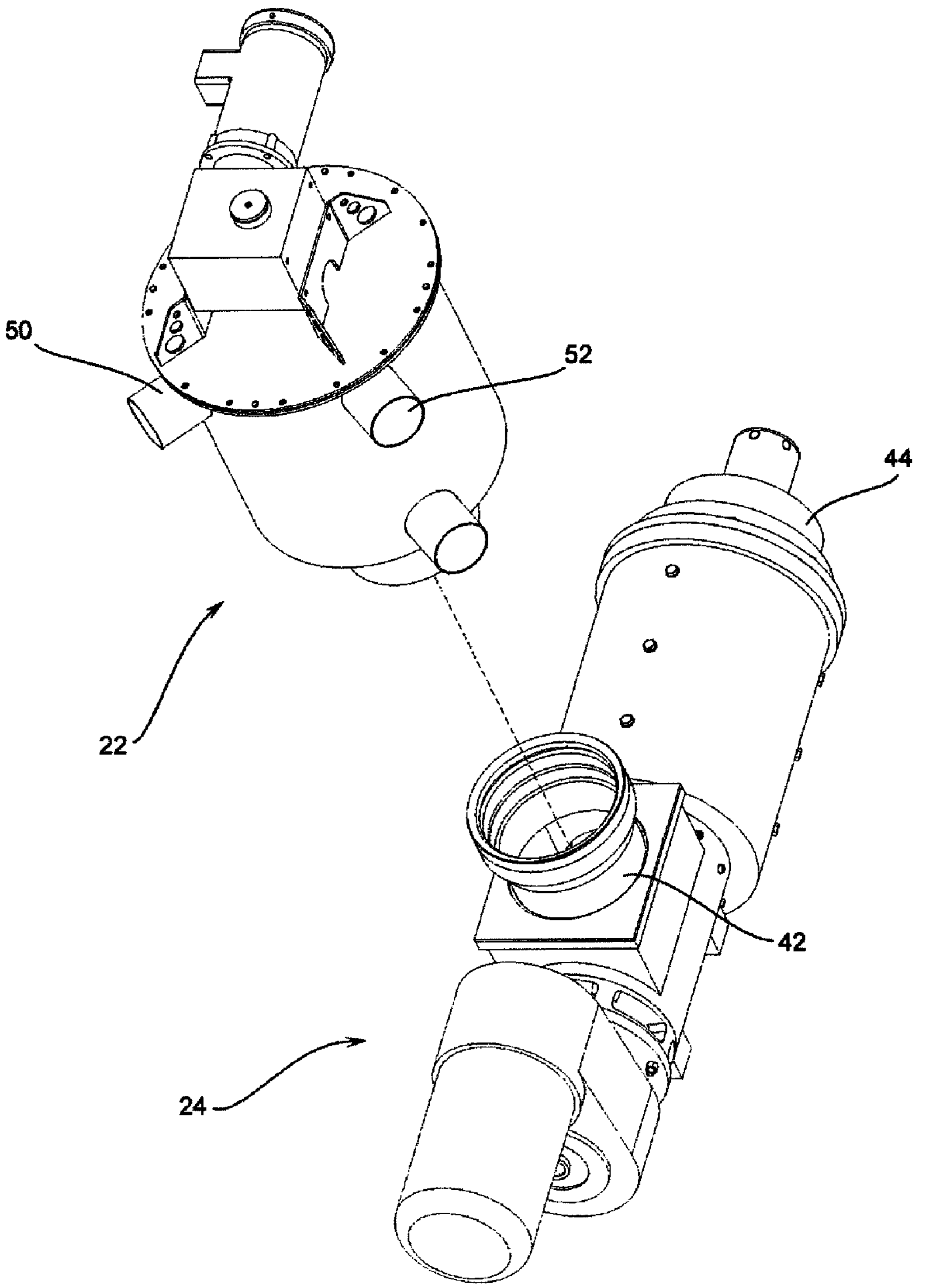
FIG. 2 shows an isometric view of the pre-separator positioned in an exploded matter vertically above the screw press separator.
Figure 3:
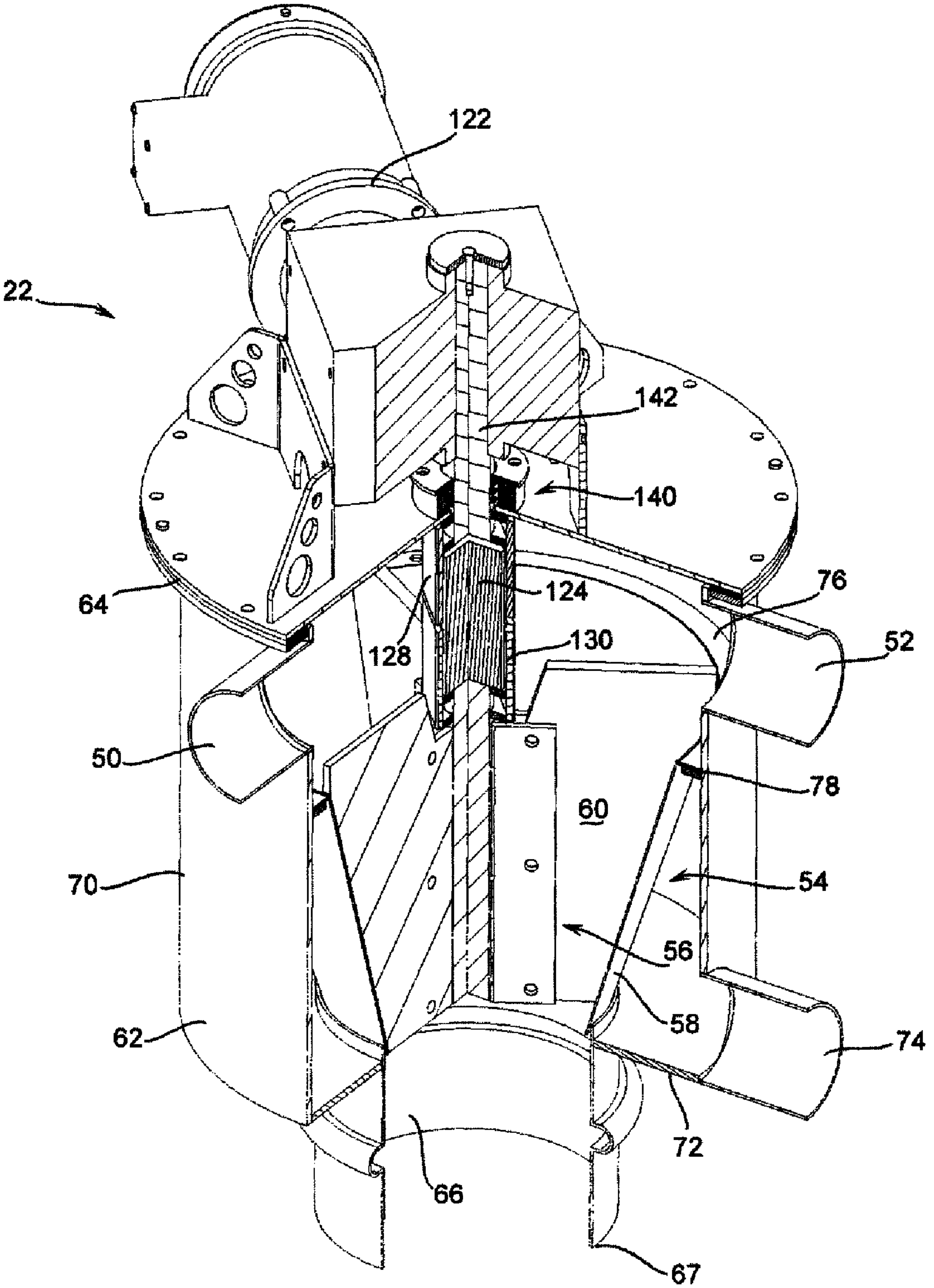
FIG. 3 shows a partial sectional view of the pre-separator.

As shown in FIG. 2, the pre-separator 22 is shown having an input line 50 and a bypass line 52. As shown in FIG. 3, the input line 50 provides an input of a water manure mixture, or in the broader scope, a water-solid mixture to be injected in the pre-separator chamber 60. It should be noted that the screw press separator 24 is a flooded system wherein there is a mixture of manure and water contained in the cylindrical chamber portion 46 as shown in FIG. 4. However, in a preferred form as shown in FIG. 3, the flooded system occurs upwardly through the input portion 42, through the output region 66 of the pre-separator 22, up to the upper portion 64 of the pre-separator 22. Therefore, fluid and solid material such as a water manure mixture would enter one of the two lines 50 or 52, but for purposes of explanation would enter in the input line 50, and any excess fluid passing through the system would exit out line 52 to a third location or be circulated \back to the input line 52. In general, the pre-separator 22 as shown in FIG. 3 generally comprises an upper region 64 and a lower region 62. Positioned in the lower region is an output portion 66 which defines a pre-separator discharge port. The pre-separator comprises a pre-separation system 54, which comprises in part a wiper assembly 56 and a screen member 58.

Figure 9:
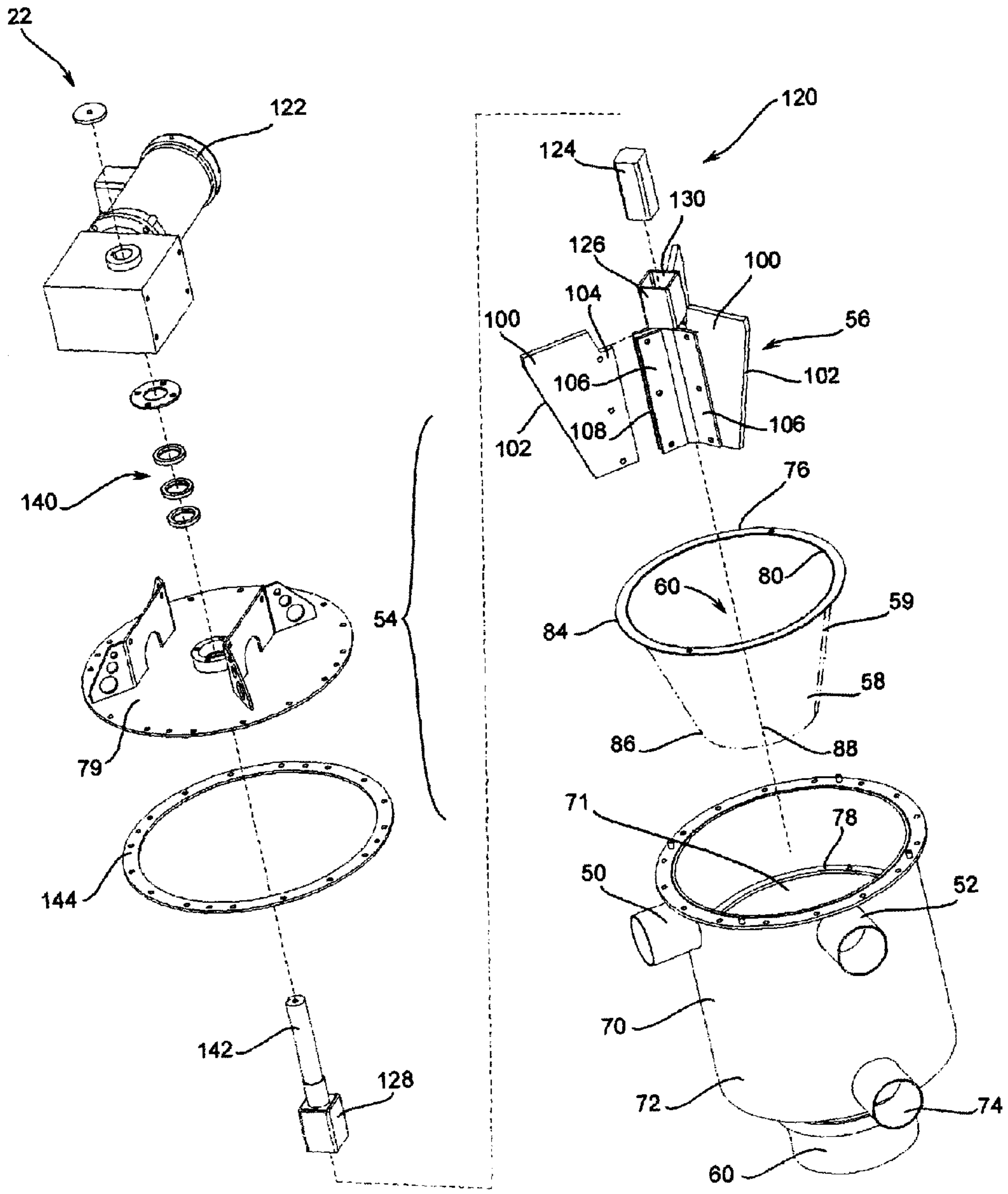
FIG. 9 shows an exploded view of the pre-separator.
Figure 10:
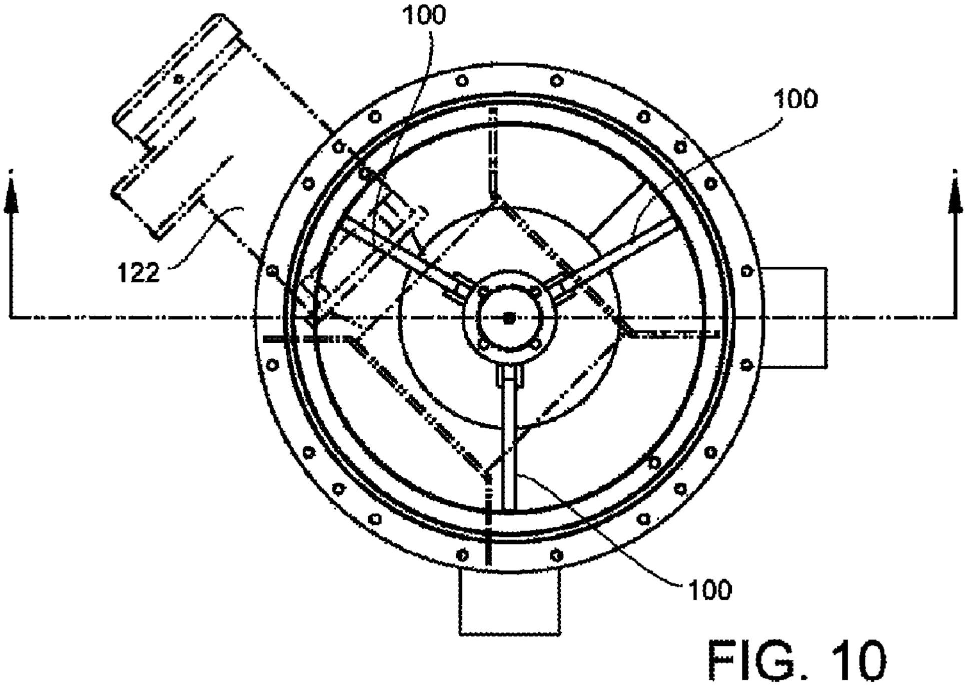
FIG. 10 shows a top view of the pre-separator with the drive system removed therefrom.

Further, as best shown in combination between FIGS. 3 and 9, the pre-separator further comprises a barrel 70 which in one form provides for the input line 50 and the bypass line 52. Positioned in the lower region 72 of the barrel is the effluent line 74 which discharges the water separated from the water manure mixture as described further herein. In one form, the screen member 58 has a flange 76 which is configured to rest upon the annular flange 78 of the barrel 70.

The screen member 58 is in a preferred form a frustoconical design, and in general, a foraminous member having a plurality of holes which in one form range between 1/16 to 1/8 of an inch in diameter. In this broader range at 1/16 of an inch it has been found that the separation was not ideal where an undesirable lower amount of water was separator through the pre-separator 22. Present analysis indicates that providing a plurality of holes at 1/8 of an inch in diameter may allow an undesired amount of solid material to be lost through these holes. Therefore, present analysis indicates a plurality of holes at approximately 3/32 of an inch in diameter provides a desirable combination of removing the water and minimizing loss of manure solids. The holes are formed on the screen interior surface 80, where in one form, a punch screen is utilized in manufacturing to form the plurality of holes. The screen member in general has an upper portion 84 and a lower portion 86 where the frustoconical nature has an upper portion 84 or entry region that is of a greater diameter than the lower portion 86. As described further herein, providing a frustoconical interior surface is desirable to allow for the wiper assembly 56 to reposition about the central axis 88 of the screen member 58 so the wiper assembly is maintained in a proper orientation with respect to the screen member 58.

Figure 11:
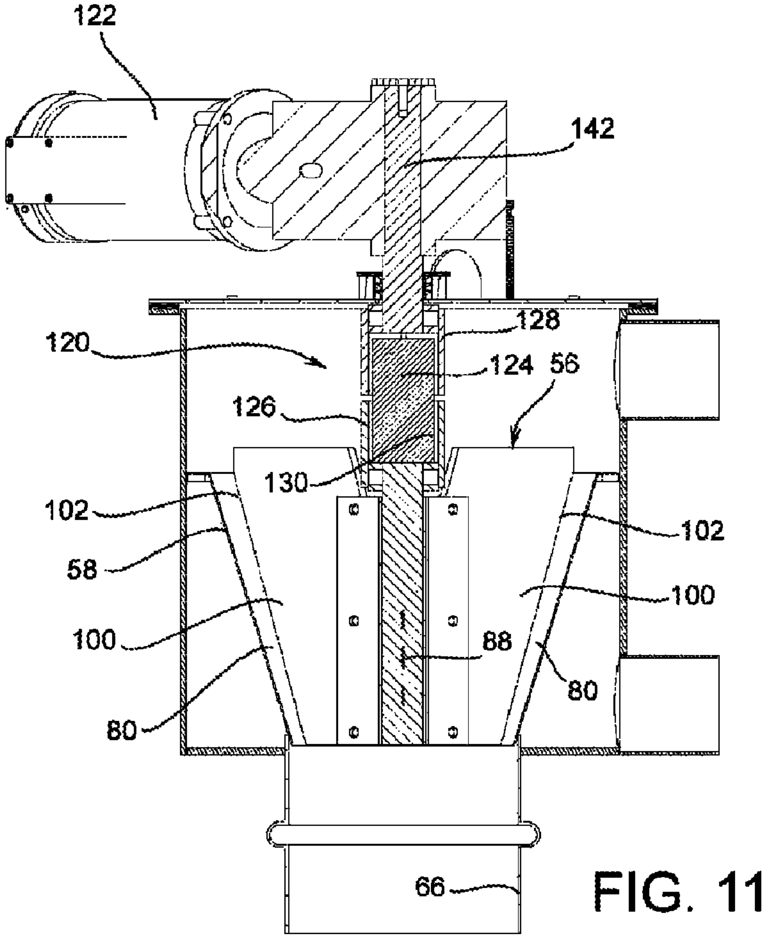
FIG. 11 shows a sectional view taken at line 11-11 of FIG. 10 showing the interior portions of the pre-separator.

Referring to FIGS. 9 and 11, it can be appreciated that the wiper assembly 56 is comprised of a plurality of wipers 100. The wipers 100 have an edge surface 102 which is slanted and operatively configured to engage the screen interior surface 80 of the screen member 58. In one preferred form, three wiper members are utilized so such that if one wiper becomes disengaged from the interior surface 80, for example by a large piece of particulate matter providing separation therefrom the screen member 58, the opposing two wipers will maintain contact with the interior surface 80. If four wipers were utilized for example, which is a possible except the adjacent two wipers at 90° would be disengaged from the screen and only the opposing wiper from the disengaged wiper would be in engagement to the screen member 58. Therefore, in one preferred form, three wiper members are utilized where the coupling system 120 described herein provides the transfer of the torque from the drive system 122 and further allows for the constant substantial engagement of the edge surfaces 102 with the interior surface 80.

The plurality of wipers when fitted together form a path of the edge surface 102 which is of a frustoconical-type shape. In one form, the wipers are fixedly attached at the interior base region 104 to a base member 106. In other forms, the coupling system 120 could for example comprise a spring member interposed at the surface defining the gap region 108 so as to reposition the wipers 100 radially outwardly. However, one preferred form of a coupling system 120 is to provide a shaft connector 124 between the upper base member 126 and the drive shaft 128. In general, the upper base member 126 is provided with a non-cylindrical interior surface 130.

The drive system 122 shown in FIG. 9 at the upper left-hand portion of the exploded view in one form is a hollow shaft gear box driven by any one of a plurality of different mechanisms, such as an electric motor or the like. In one form, the drive system 122 is configured to fit upon the upper plate 79 of the barrel 70 and a sealing assembly 140 is provided, which in one form is a plurality of seals to fit around the drive shaft 128 at the upper portion 142. As noted above, because the first pre-separator 22 is a flooded system, the sealing assembly 140 is utilized for the shaft portion 142 as shown in FIG. 3. Additional seals such as the barrel seal 144 can be utilized to seal the system.

Therefore, it can be appreciated that as the wiper assembly 56 rotates, the pre-separation system 54 operates in a matter where there is a "wiping" of the water/manure mixture entering the pre-separation chamber 60. Thereafter, the water is discharged and passes through the foraminous surface of the frustoconical screen member 58, and as shown in FIG. 4, this water is transmitted to the effluent discharge chamber 150 which is defined in part by the interior portion 71 of the barrel 70 and the outer surface 59 of the screen member 58. Thereafter, the water is discharged through the effluent line 74 and in one form is in communication with the effluent line 41 of the screw press separator 24.

As shown in FIG. 11, it can be appreciated that the edge surfaces 102 of the wipers 100 are configured to maintain engagement with the screen interior surface 80 by way of the wiper assembly 56 being able to reposition downwardly about the central axis 88 of the screen member 58. In one form, the coupling system 120 is comprised of the member 124 which can telescopically extend between the drive shaft 128 and the upper base member 126. As noted above, the interior surface 130 is non-cylindrical, and can transfer rotational torque to the wiper assembly 56 and still allow the wiper assembly to reposition with respect to the screen member 58 so as to maintain the engagement of the edge surfaces 102 of the wipers 100 with the interior surface 80 of the screen member 58. In the broader scope, other arrangements can be provided, such as providing for repositioning of the screen member 58 with respect to the wiper assembly 56, and further the screen member 58 could rotate with respect to the wiper assembly 56, wherein in one form the wiper assembly could be stationary.

The non-cylindrical interior surface 130 of the upper base member 126 is defined broadly to not only include a square or rectangular member as shown in FIG. 9, but further could have other configurations to allow torque to be transferred between the drive system and the wiper assembly. For example, the cross-sectional surface of the non-cylindrical interior surface of the base could be triangular, rectangular, pentagonal, or other types of polygon shapes or further could indeed be cylindrical but, for example, have a laterally extending members such as a rod or pin configured to fit within a slot in the base, or vice versa. Therefore, a non-cylindrical interior surface is defined broadly even to include surfaces which may be partially cylindrical but have the capability of transferring torque between the drive system and the wiper assembly and allow for repositioning of the wiper assembly along the central axis with respect to the screen member. Of course, in the broader scope, the screen member could be on a repositional system so as to reposition upwardly along the central axis to engage the edge surfaces of the wipers.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

Therefore I claim:

1. A pre-separator operatively configured to be positioned in fluid communication with a screw press separator having a flooded system, the pre-separator comprising:

a. a barrel having an interior chamber portion, the barrel having an upper and lower region, an input line positioned in the upper region of the barrel, a bypass line also positioned in the upper region of the barrel, the barrel further having an effluent line positioned in the lower region thereof;

b. a screen member having a central axis, being generally configured as a foraminous frustoconical shape having a screen interior surface, the screen member operatively configured to be positioned within the barrel such that an upper portion of the screen member defining an entry region is positioned below the input line and the bypass line, the screen member and the barrel defining an effluent discharge chamber which is in fluid communication with the effluent line;

c. a wiper assembly comprising a plurality of wipers each comprising an edge surface configured to engage the screen interior surface, the wiper assembly operatively preconfigured to rotate about a central axis of the screen member;

d. a drive system configured to rotate the wiper assembly with respect to the screen member; and e. a coupling system operatively configured to transfer torque between the drive system and the wiper assembly, the coupling system configured to allow for repositioning of the wiper assembly along the central axis of the screen member so as to maintain engagement between at least one edge surface of a wiper of the wiper assembly and the screen interior surface of the screen member.

2. The pre-separator as recited in claim 1 where the wiper assembly comprises three wipers.

3. The pre-separator as recited in claim 2 where the plurality of wipers of the wiper assembly is fixedly attached to a base member having a non-cylindrical interior surface.

4. The pre-separator as recited in claim 2 wherein having three wipers in the wiper assembly allows for the edge surface of at least one wiper to be in engagement with the screen interior surface of the screen member when a particulate matter passes through the pre-separator and is interposed between a wiper screen member, at least one of the three wipers of the wiper assemblies is in engagement with the screen interior surface of the screen member.

5. The pre-separator as recited in claim 4 where the manure/water mixture of a particulate matter is less than 2% solids.

6. The pre-separator as recited in claim 1 where the screen interior surface defines a pre-separation chamber which is operatively configured to be filled with a manure and water mixture during operation of the wiper assembly whereas excess of the manure water mixture is passed through the bypass line.

7. The pre-separator as recited in claim 5 where the manure water mixture exiting the screen member in a lower portion of the screen member through a pre-separator discharge port has a solid content of greater then 3%.

8. The pre-separator as recited in claim 1 where the drive system comprises a hollow drive shaft having a plurality of seals upon a drive shaft, the drive shaft operatively configured to transfer torque to the wiper assembly.

9. A fiber separating system comprising:

a. a screw press separator having an input portion and an output portion, b. an interior auger member positioned upon a central shaft, the auger member being fit within the cylindrical screen, an effluent line being positioned in communication with an outer portion of a cylindrical screen, c. a pre-separator in communication with the input portion of the screw press separator, the pre-separator comprising:

i. a frustoconical screen member having a central axis and a screen interior surface, ii. a wiper assembly having a plurality of wipers, each wiper having an edge surface operatively configured to engage the screen interior surface of the frustoconical screen member, iii. a drive system configured to provide rotation of the wiper assembly with respect to the frustoconical screen member, iv. a coupling system operatively configured to transfer torque between the drive system and the wiper assembly so as to maintain contact of the edge surface of at least one wiper of the wiper assembly and the screen interior surface of the frustoconical screen member.

10. The fiber separating system as recited in claim 9 where the screen member is configured to be stationary and the wiper assembly is operatively configured to rotate with respect to the screen member.

11. The fiber separating system as recited in claim 9 where the frustoconical screen member is configured to rotate with respect to the wiper assembly.

12. The fiber separating system as recited in claim 11 where the wiper assembly is configured to be stationary with respect to rotation about the central axis of the frustoconical screen member.

13. The fiber separating system as recited in claim 9 where the coupling system is configured to allow the wiper assembly to reposition vertically downward as torque is applied thereto so as to maintain the contact of at least one edge surface of a wiper with the screen interior surface.

14. The fiber separating system as recited in claim 13 where as the edge surface of a wiper wears, the wiper assembly will reposition downwardly to maintain engagement of at least one wiper edge surface with the screen interior surface.

15. The fiber separating system as recited in claim 14 where the pre-separator is configured to increase the concentration of solids inserted in the pre-separator by over 100%.

16. The fiber separating system as recited in claim 9 wherein an effluent line is in fluid communication with the pre-separator so as to channel effluent discharged from the outer portion of the screen member.

17. The fiber separating system as recited in claim 16 where the effluent line of the pre-separator is in fluid communication with the effluent line of the screw press separator.

18. The fiber separating system as recited in claim 17 where the screw press separator and the pre-separator comprise a flooded system having a mixture of manure and water filled therein between the interior auger member of the screw press separator up through a pre-separation chamber defined in part by the screen interior surface of the frustoconical screen member.

19. The fiber separating system as recited in claim 18 wherein an input line is operatively configured to input the manure and water mixture into the pre-separator chamber and a bypass line is configured to allow the manure and water mixture which is not received by the pre-separator system to circulate therethrough back to the input line.

20. The fiber separating system as recited in claim 9 where the frustoconical screen member is comprised of a plurality of holes at 3/32 of an inch in diameter, plus or minus 1/64 of an inch.

21. The fiber separating system as recited in claim 9 where the plurality of holes in the frustoconical screen member ranges between 1/16 to 1/8 of an inch in diameter.

* * * * *